(12) United States Patent
Aono et al.

(10) Patent No.: US 11,764,626 B2
(45) Date of Patent: Sep. 19, 2023

(54) ROTOR AND MOTOR

(71) Applicant: NIDEC CORPORATION, Kyoto (JP)

(72) Inventors: Masato Aono, Kyoto (JP); Hideaki Uchise, Kyoto (JP); Tatsuya Ito, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 415 days.

(21) Appl. No.: 17/263,896

(22) PCT Filed: Aug. 2, 2019

(86) PCT No.: PCT/JP2019/030427
§ 371 (c)(1),
(2) Date: Jan. 28, 2021

(87) PCT Pub. No.: WO2020/027315
PCT Pub. Date: Feb. 6, 2020

(65) Prior Publication Data
US 2021/0320542 A1    Oct. 14, 2021

(30) Foreign Application Priority Data

Aug. 3, 2018 (JP) ................................. 2018-146794

(51) Int. Cl.
*H02K 1/27* (2022.01)
*H02K 1/28* (2006.01)
*H02K 1/278* (2022.01)

(52) U.S. Cl.
CPC ............. *H02K 1/278* (2013.01); *H02K 1/28* (2013.01)

(58) Field of Classification Search
CPC ................................. H02K 1/278; H02K 1/28
See application file for complete search history.

(56) References Cited

U.S. PATENT DOCUMENTS 8,415,845 B2    4/2013   Miyachi et al.
9,178,394 B2   11/2015   Asahi et al.
(Continued)

FOREIGN PATENT DOCUMENTS

JP    2008295140 A    12/2008
JP    2015144565 A     8/2015
(Continued)

OTHER PUBLICATIONS

International Search Report in PCT/JP2019/030427, dated Sep. 24, 2019. 4pp.

*Primary Examiner* — Thomas Truong
(74) *Attorney, Agent, or Firm* — HAUPTMAN HAM, LLP

(57) ABSTRACT

A rotor includes a rotor core, a plurality of magnets positioned radially outside the rotor core, a rotor cover having a tubular portion surrounding the rotor core and the magnet, and a resin portion coupling the rotor core and the magnet with each other. The resin portion has a first lid portion positioned on one axial side of the rotor core and the magnet. The rotor cover has a flange portion projecting radially inward from the tubular portion on one axial side of the first lid portion. The first lid portion has a recess portion depressed from a surface on one axial side of the first lid portion. The recess portion is positioned at a position overlapping between the circumferentially adjacent magnets. The flange portion has a first swage portion swaged to the other axial side and positioned inside the recess portion.

13 Claims, 8 Drawing Sheets

(56) References Cited

U.S. PATENT DOCUMENTS

| | | | |
|---|---|---|---|
| 9,190,878 B2 | 11/2015 | Kottimyer et al. | |
| 10,411,549 B2* | 9/2019 | Kono | H02K 1/278 |
| 2013/0257184 A1* | 10/2013 | Haga | H02K 15/03 |
| | | | 310/43 |

FOREIGN PATENT DOCUMENTS

| | | | |
|---|---|---|---|
| WO | 2018062349 A1 | 4/2018 | |
| WO | 2018062350 A1 | 4/2018 | |

* cited by examiner

ROTOR AND MOTOR

CROSS-REFERENCE TO RELATED APPLICATIONS

This is the U.S. national stage of application No. PCT/JP2019/030427, filed on Aug. 2, 2019, and priority under 35 U.S.C. § 119(a) and 35 U.S.C. § 365(b) is claimed from Japanese Patent Application No. 2018-146794, filed on Aug. 3, 2018.

FIELD OF THE INVENTION

The present invention relates to a rotor and a motor. This application is based on Japanese Patent Application No. 2018-146794, filed on Aug. 3, 2018. This application is to claim the benefit of priority to the application. The entire content thereof is incorporated herein by reference.

BACKGROUND

Rotors including rotor covers covering rotor cores and permanent magnets are known. For example, a motor for electric power steering including such a rotor is known.

In the rotor described above, it is necessary to inhibit the rotor cover from rotating relative to the rotor core. Methods of inhibiting the rotor cover from rotating relative to the rotor core include a method of adhering the rotor cover to a permanent magnet fixed to the rotor core with an adhesive. However, this method sometimes fails to inhibit the rotor cover from rotating relative to the rotor core when the adhesive is peeled off.

SUMMARY

An exemplary rotor of the present invention includes a shaft arranged along a center axis extending in one direction, a rotor core fixed to the shaft, a plurality of magnets positioned radially outside the rotor core and arranged along a circumferential direction, a rotor cover having a tubular portion surrounding the rotor core and the magnet radially outside the magnet, and a resin portion at least partially positioned radially inside the rotor cover, and coupling the rotor core and the magnet with each other and holding the rotor core and the magnet. The resin portion has a first lid portion positioned on one axial side of the rotor core and the magnet. The rotor cover has a flange portion projecting radially inward from the tubular portion on one axial side of the first lid portion. The first lid portion has a recess portion depressed from a surface on one axial side of the first lid portion to the other axial side. The recess portion is positioned at a position overlapping between the magnets circumferentially adjacent to each other when viewed along the axial direction. The flange portion has a first swage portion swaged to the other axial side. The first swage portion is positioned inside the recess portion.

An exemplary motor of the present invention includes the rotor and a stator facing the rotor radially via a gap.

The above and other elements, features, steps, characteristics and advantages of the present disclosure will become more apparent from the following detailed description of the preferred embodiments with reference to the attached drawings.

DETAILED DESCRIPTION

Figure 1:
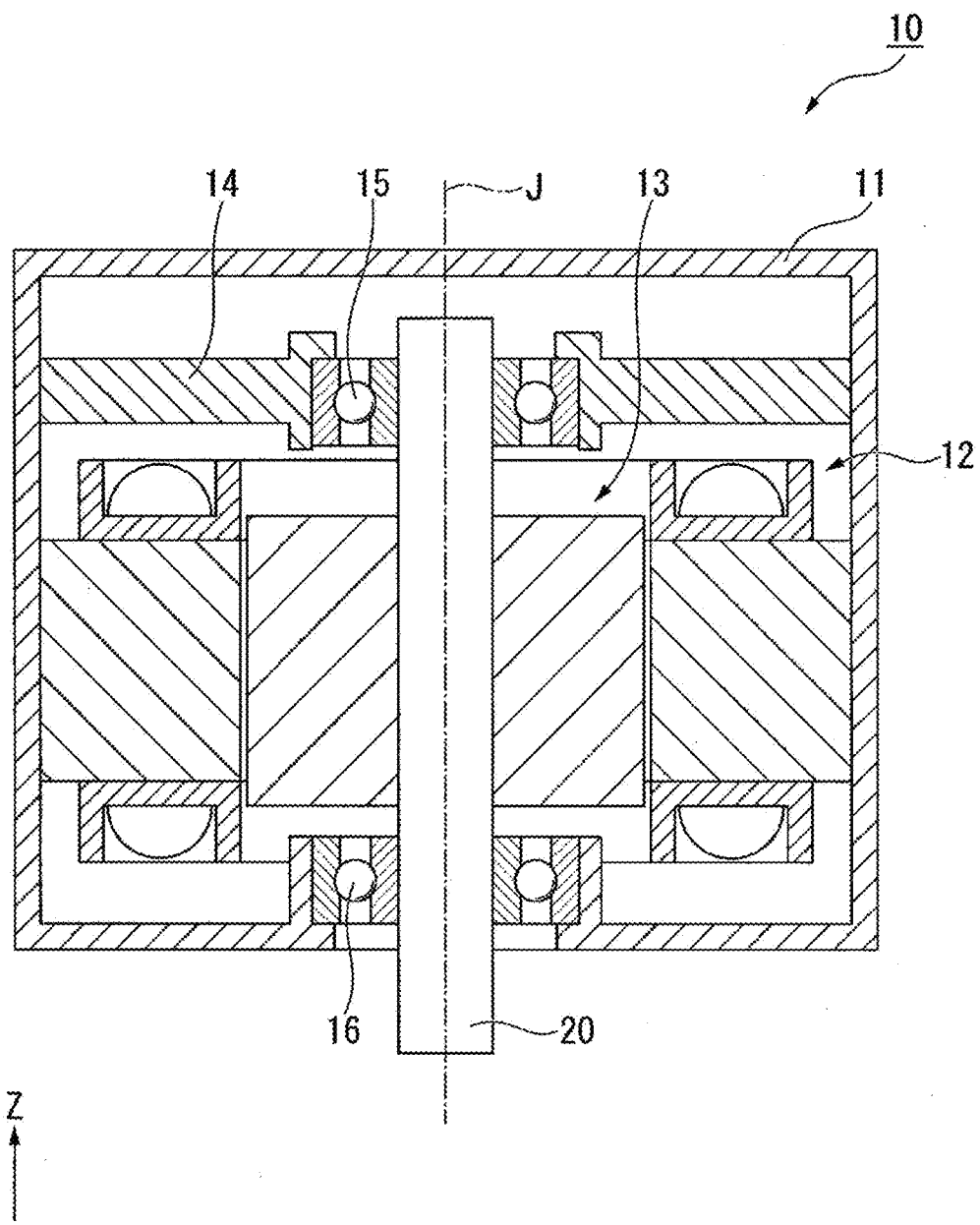
FIG. 1 is a sectional view showing a motor of the present embodiment.

As shown in FIG. 1, a motor 10 of the present embodiment includes a housing 11, a stator 12, a rotor 13 including a shaft 20 arranged along a center axis J extending in one direction, a bearing holder 14, and bearings 15 and 16. The housing 11 has a bottomed tubular shape and houses the stator 12, the rotor 13, the bearing holder 14, and the bearings 15 and 16. The stator 12 faces the rotor 13 radially via a gap radially outside the rotor 13. The shaft 20 is rotatably supported by the bearings 15 and 16. The bearings 15 and 16 are ball bearings, for example. The bearing 15 is held by a bearing holder 14. The bearing 16 is held at the bottom of the housing 11. The shaft 20 has a columnar shape axially extending about the center axis J.

In each figure, the direction parallel to the direction in which the center axis J extends is indicated by a Z axis. In the following description, the direction parallel to the direction in which the center axis J extends is simply referred to as an "axial direction". The radial direction about the center axis J is simply referred to as a "radial direction" and the circumferential direction about the center axis J is simply referred to as a "circumferential direction". The positive side in the Z axis direction is defined as an "upper side" and the negative side in the Z axis direction is defined as a "lower side".

In the present embodiment, the lower side corresponds to one axial side. The upper side corresponds to the other axial side. It is to be noted that the upper side and the lower side are the names simply for explaining the relative positional relationship of each part, and the actual positional relationship and the like may be a positional relationship and the like other than the positional relationship and the like indicated by these names.

Figure 2:
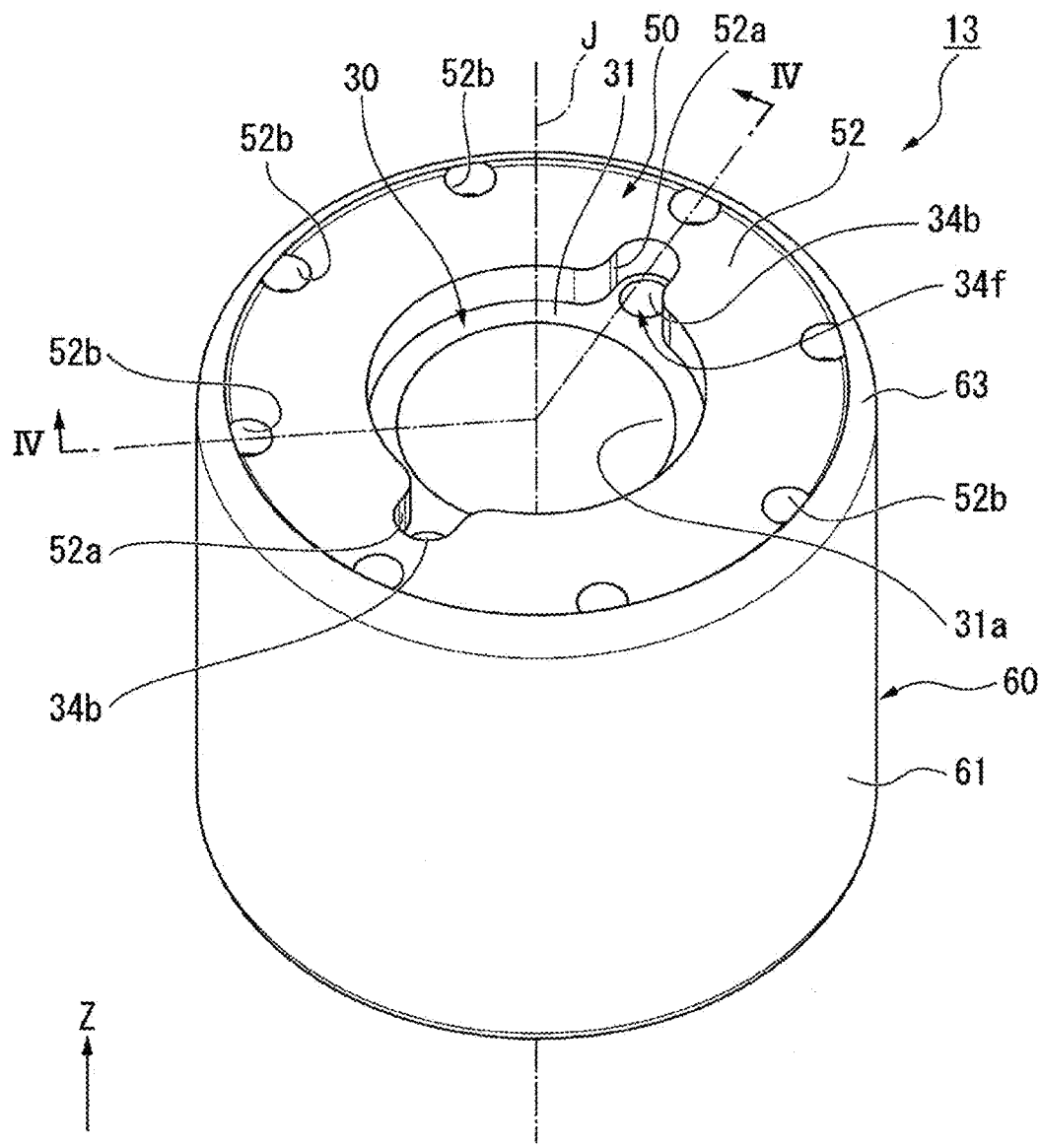
FIG. 2 is a perspective view showing a part of a rotor of the present embodiment.
Figure 3:
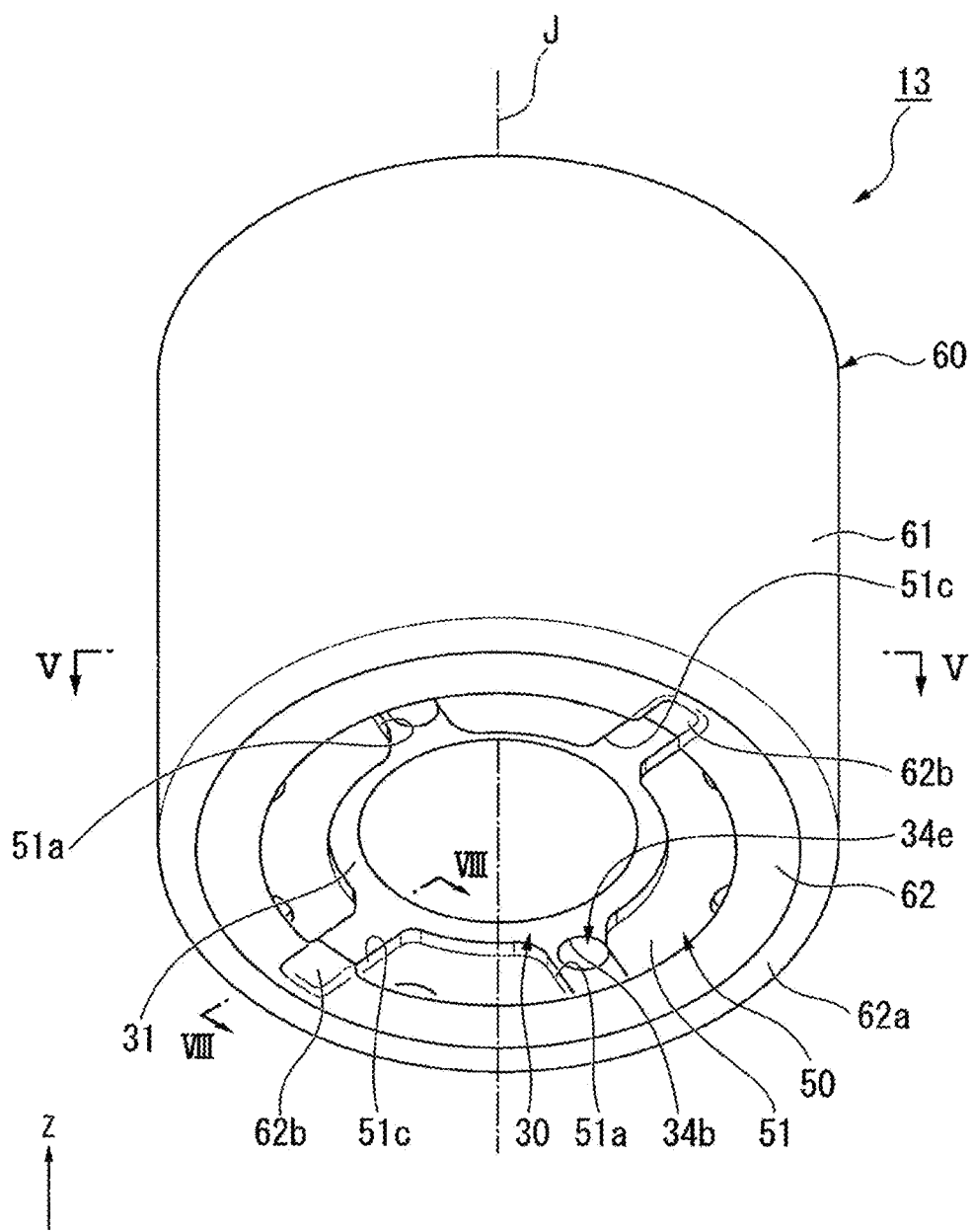
FIG. 3 is a perspective view showing a part of the rotor of the present embodiment.
Figure 4:
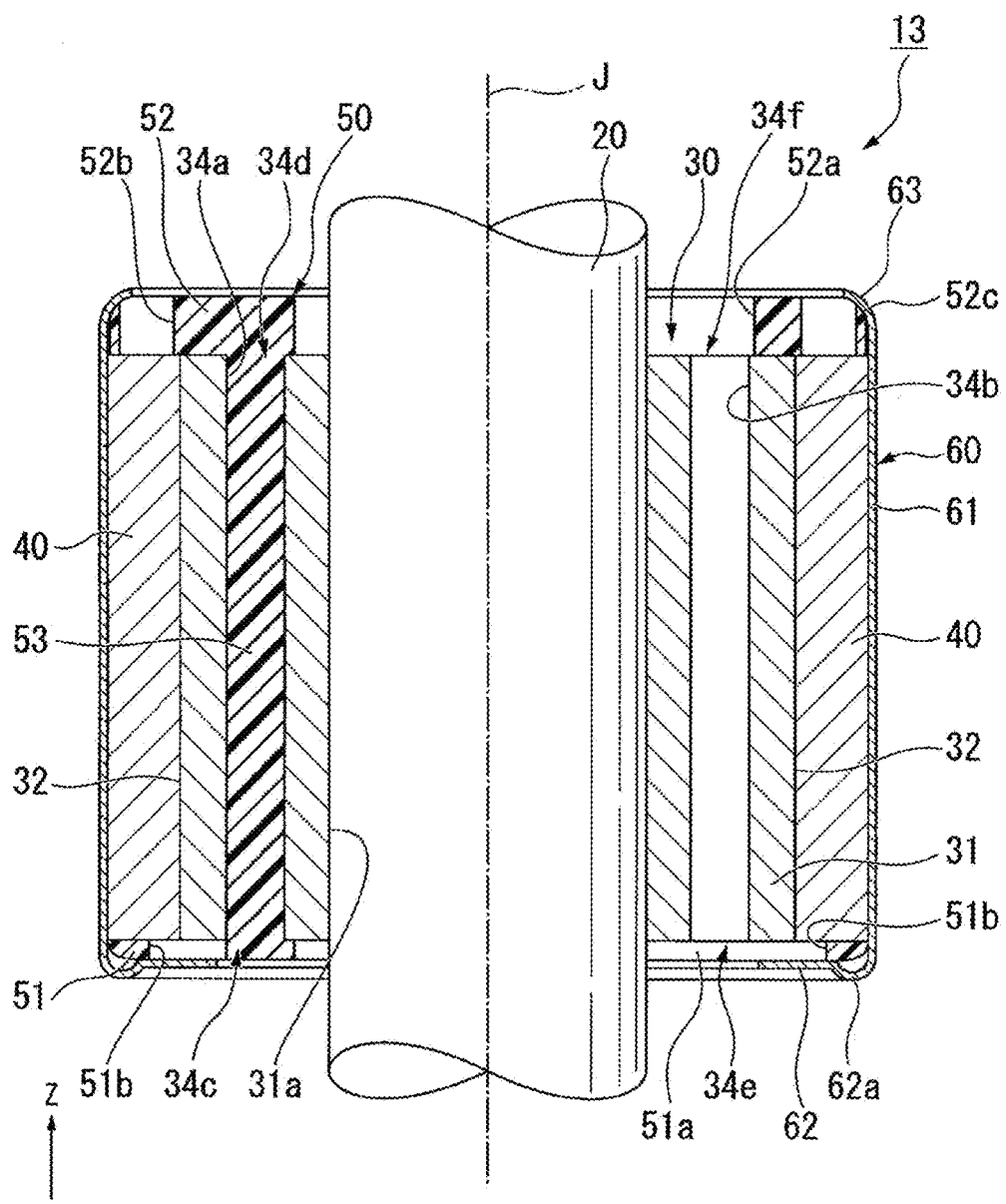
FIG. 4 is a sectional view showing the rotor of the present embodiment, and is a sectional view of IVIV in FIG. 2.
Figure 5:
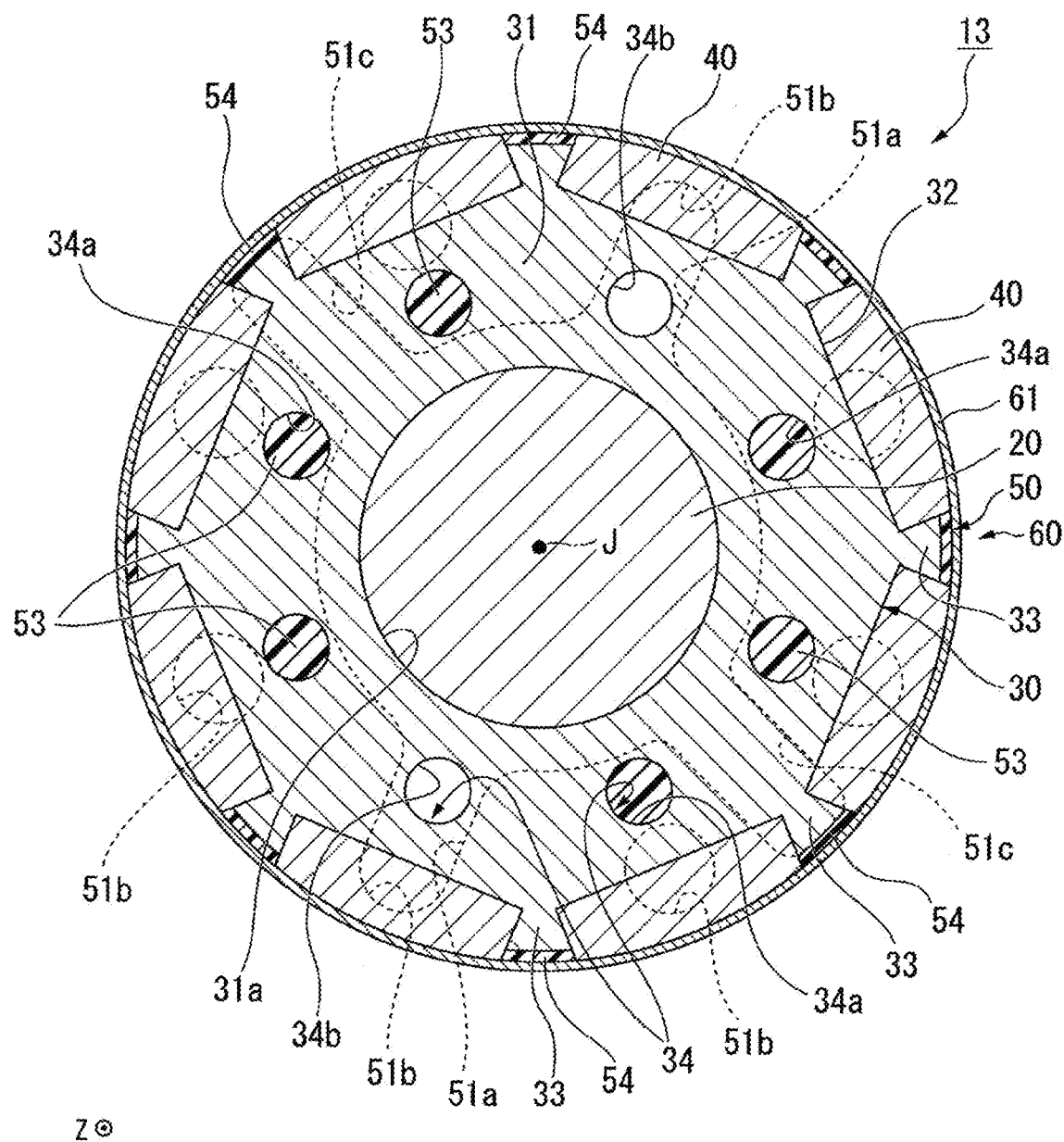
FIG. 5 is a sectional view showing a part of the rotor of the present embodiment, and is a sectional view of V-V in FIG. 3.
Figure 6:
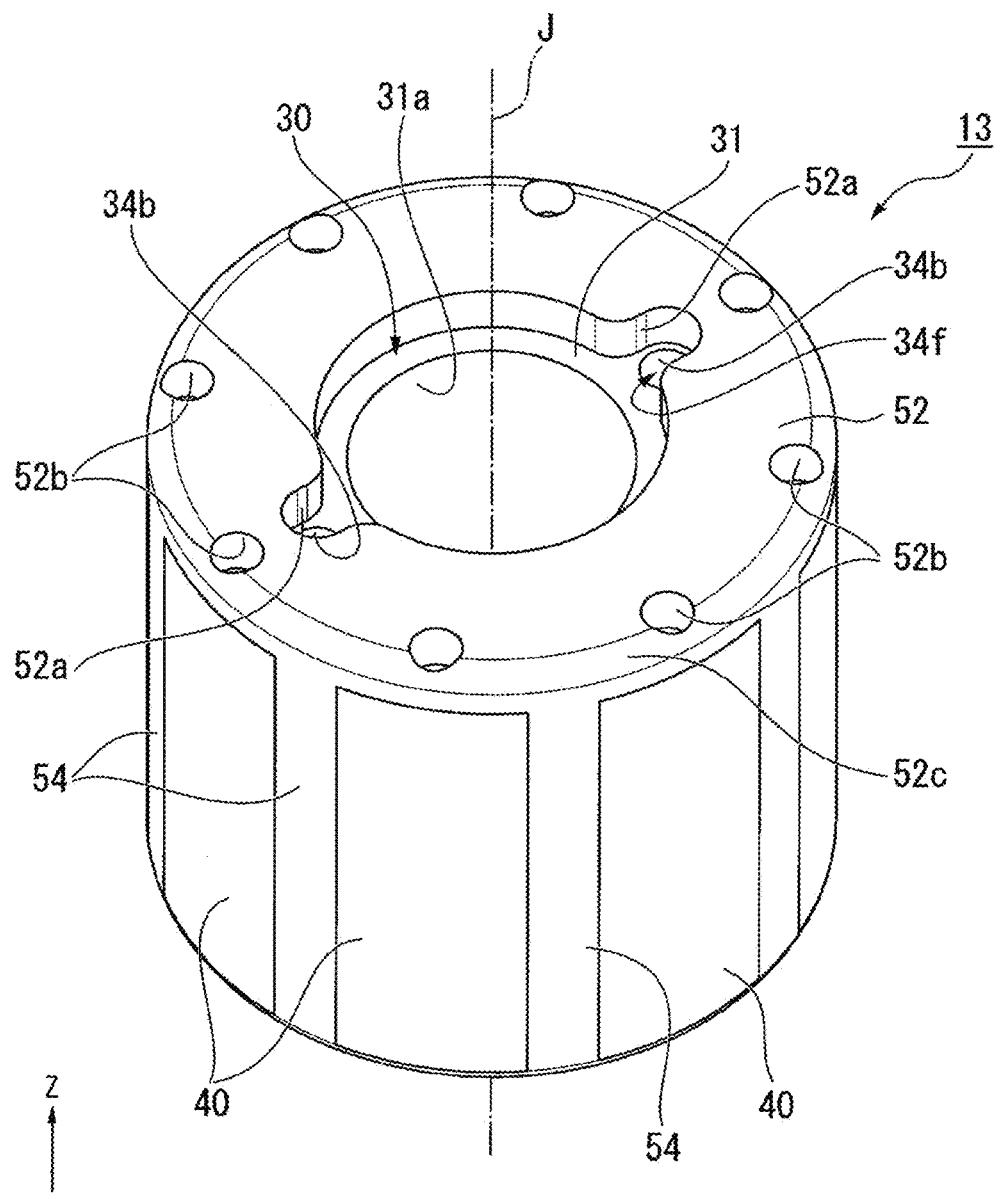
FIG. 6 is a perspective view showing a part of the rotor of the present embodiment.
Figure 7:
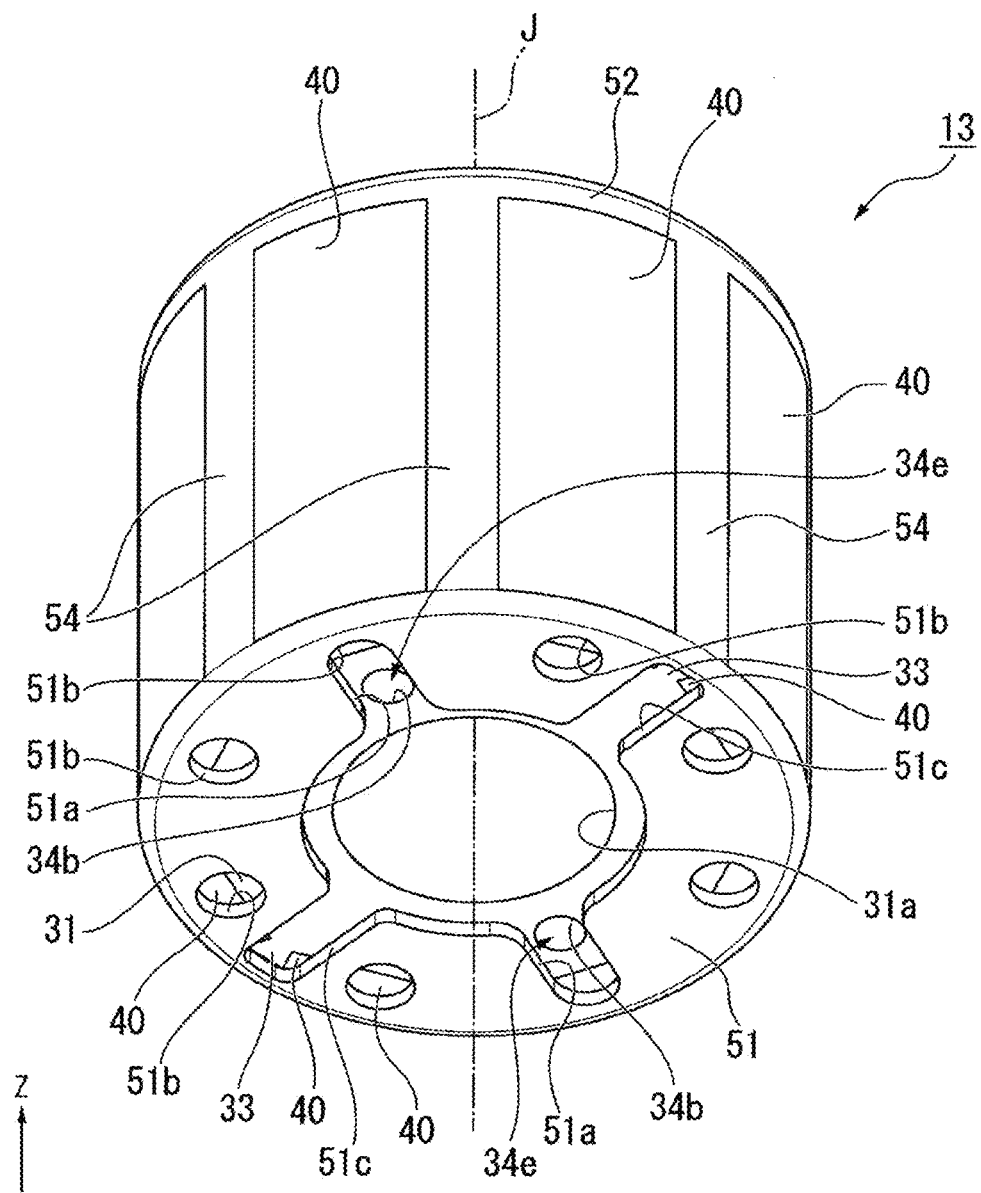
FIG. 7 is a perspective view showing a part of the rotor of the present embodiment.

As shown in FIGS. 2 to 5, the rotor 13 of the present embodiment includes the shaft 20, a rotor core 30, a plurality of magnets 40, a rotor cover 60, and a resin portion 50. It is to be noted that in FIGS. 2, 3, 6, and 7, the shaft 20 is not illustrated. In FIGS. 6 and 7, the rotor cover 60 is not illustrated. As shown in FIG. 4, the rotor core 30 has an axially extending pillared shape. Although not illustrated, the rotor core 30 is constituted by, for example, axially laminating a plurality of plate members. As shown in FIG. 5, the rotor core 30 has a rotor core body 31 and a plurality of protrusion portions 33. In the present embodiment, the number of magnets 40 is eight. The plate member constituting the rotor core 30 is an electromagnetic steel plate, for example.

The rotor core body 31 extends axially. More specifically, the rotor core body 31 has a substantially regular octagonal pillar shape about the center axis J. The rotor core body 31 has a plurality of magnet support surfaces 32. The magnet support surface 32 extends axially. The magnet support surface 32 is a flat surface orthogonal to the radial direction. The plurality of magnet support surfaces 32 is arranged at equal intervals over the circumference along the circumferential direction. The plurality of magnet support surfaces 32 is a plurality of respective radial outer surfaces of the rotor core body 31 having the regular octagonal pillar shape.

The rotor core body 31 has a fixing hole portion 31*a* axially penetrating the rotor core body 31. The fixing hole portion 31*a* has a circular shape about the center axis J when viewed along the axial direction. As shown in FIG. 4, the shaft 20 passes through the fixing hole portion 31*a*. The inner circumferential surface of the fixing hole portion 31*a* is fixed to the outer circumferential surface of the shaft 20. Thus, the rotor core 30 is fixed to the shaft 20.

As shown in FIG. 5, the protrusion portion 33 projects radially outward from the rotor core body 31. Although not illustrated, the protrusion portion 33 extends from the upper end portion of the rotor core body 31 to the lower end portion of the rotor core body 31. The radial outer surface of the protrusion portion 33 is a flat surface orthogonal to the radial direction. The circumferential dimension of the protrusion portion 33 increases from the radial inside toward the radial outside. The plurality of protrusion portions 33 are arranged side by side over the circumference along the circumferential direction. The circumferential intervals of the plurality of protrusion portions 33 are, for example, the same as each other. The number of the plurality of protrusion portions 33 is eight, for example. The eight protrusion portions 33 project radially outward from each corner portion of the rotor core body 31 having the substantially regular octagonal pillar shape.

The rotor core 30 has a plurality of core through holes 34 axially penetrating the rotor core 30. The core through hole 34 axially penetrates the rotor core body 31. The plurality of core through holes 34 are arranged side by side over the circumference along the circumferential direction. The circumferential intervals of the plurality of core through holes 34 are, for example, the same as each other. The core through hole 34 is circular when viewed along the axial direction. The number of the core through holes 34 is eight, for example. Each of the core through holes 34 is positioned radially inside each magnet 40.

Some of the core through holes 34 of the plurality of core through holes 34 are first core through holes 34*a* through which a first coupling portion 53 described later passes. As shown in FIG. 4, opening portions 34*c* and 34*d* on both axial sides of the first core through hole 34*a* are closed by the resin portion 50.

As shown in FIG. 5, some other core through holes 34 of the plurality of core through holes 34 are second core through holes 34*b* positioned at positions different from those of the first coupling portions 53 when viewed along the axial direction. In the present description, "the second core through hole is positioned at a position different from that of the first coupling portion when viewed along the axial direction" includes that at least a part of the second core through hole does not overlap the first coupling portion when viewed along the axial direction.

As shown in FIGS. 2 to 4, at least one of opening portions 34*e* and 34*f* on both axial sides of the second core through hole 34*b* is exposed to the outside of the rotor 13. Therefore, even after the rotor 13 is manufactured by molding the resin portion 50, the rotor 13 can be circumferentially positioned by inserting a jig into the second core through hole 34*b* from the exposed opening portions 34*e* and 34*f*.

In the present embodiment, both of the opening portions 34*e* and 34*f* on both axial sides in the second core through hole 34*b* are exposed to the outside of the rotor 13. The opening portion 34*e* on the lower side of the second core through hole 34*b* is exposed to the lower side of the rotor 13. The opening portion 34*f* on the upper side of the second core through hole 34*b* is exposed on the upper side of the rotor 13. As shown in FIG. 4, the resin portion 50 is not arranged inside the second core through hole 34*b*. The inside of the second core through hole 34*b* is a space portion continuous with an outside space of the rotor 13 via the opening portions 34*e* and 34*f*.

As shown in FIG. 5, in the present embodiment, the plurality of core through holes 34 are the first core through holes 34*a*, and the other plurality of core through holes 34 are the second core through holes 34*b*. The number of the first core through holes 34*a* is six, for example. The number of the second core through holes 34*b* is two, for example. The two second core through holes 34*b* are positioned opposite to each other via the center axis J radially.

As shown in FIGS. 4 to 7, the magnet 40 has a substantially quadrangular prism shape that is radially flat and axially extending. As shown in FIG. 5, the magnet 40 is positioned radially outside the rotor core 30. The plurality of magnets 40 is arranged along the circumferential direction. The magnets 40 circumferentially adjacent to each other are arranged circumferentially apart from each other. In the present embodiment, the plurality of magnets 40 is arranged at equal intervals over the circumference along the circumferential direction. The circumferential distance between the magnets 40 circumferentially adjacent to each other increases from the radial inside toward the radial outside.

Each of the plurality of magnets 40 is arranged between the protrusion portions 33 circumferentially adjacent to each other. The end portions on both circumferential sides of the magnet 40 are in contact with the protrusion portions 33 adjacent to each other on both circumferential sides of the magnet 40. More specifically, the part from the radial center portion at the end portions of the magnet 40 on both circumferential sides to the end portion of the radial inside comes into contact with the protrusion portions 33. Thus, the magnet 40 can be circumferentially positioned by the protrusion portion 33. It is to be noted that at least one of the end portions of the magnet 40 on both circumferential sides does not need to be in contact with the protrusion portion 33.

The plurality of magnets 40 are supported respectively by the plurality of magnet support surfaces 32 respectively from the radially inside. The radial inner surface of the magnet 40 is a flat surface orthogonal to the radial direction, and comes into contact with the magnet support surface 32. The radial outer surface of the magnet 40 is a curved surface circumferentially curved along the radial inner surface of a tubular portion 61 described later of the rotor cover 60. The center of curvature of the radial outer surface of the magnet 40 coincides with the center axis J. The magnetic characteristic of the motor 10 can be improved by making the radial outer surface of the magnet 40 such a curved surface. The radial outer surface of the magnet 40 comes into contact with the radial inner surface of the rotor cover 60. Thus, the magnet 40 is radially sandwiched in a state of being brought into contact with the rotor core 30 and the rotor cover 60.

As shown in FIG. 4, the axial dimension of the magnet 40 is the same as the axial dimension of the rotor core 30, for example. The upper surface of the magnet 40 and the upper surface of the rotor core 30 are arranged on the identical plane orthogonal to the axial direction, for example. The lower surface of the magnet 40 and the lower surface of the rotor core 30 are arranged on the identical plane orthogonal to the axial direction, for example.

As shown in FIGS. 4 and 5, at least a part of the resin portion 50 is positioned radially inside the rotor cover 60. In the present embodiment, the entire resin portion 50 is positioned radially inside the rotor cover 60. The resin portion 50 couples together and holds the rotor core 30 and the magnet 40. In the present embodiment, the resin portion 50 is molded as a single member by insert molding in which resin is poured into a mold into which the rotor core 30 and the magnet 40 are inserted. The resin portion 50 has a first lid portion 51, a second lid portion 52, a first coupling portion 53, and a second coupling portion 54.

As shown in FIGS. 6 and 7, the first lid portion 51 and the second lid portion 52 are annular along the circumferential direction. In the present embodiment, the first lid portion 51 and the second lid portion 52 have an annular plate shape about the center axis J. As shown in FIG. 4, the first lid portion 51 is positioned below the rotor core 30 and the magnet 40. The first lid portion 51 comes into contact with the lower surface of the rotor core 30 and the lower surface of the magnet 40.

The radial inner edge of the first lid portion 51 is positioned radially outside relative to the fixing hole portion 31a and radially inside relative to the first core through hole 34a. The radial outer edge of the first lid portion 51 comes into contact with an inner circumferential surface of the tubular portion 61. The first lid portion 51 closes the first core through hole 34a from below.

As shown in FIG. 7, the first lid portion 51 has a first through portion 51a and a plurality of second through portions 51b. The first through portion 51a and the second through portion 51b axially penetrate the first lid portion 51. The first through portion 51a is depressed radially outward from the radial inner edge of the first lid portion 51. The first through portion 51a has a substantially rectangular shape radially elongated when viewed along the axial direction. In the present embodiment, two first through portions 51a are provided. The two first through portions 51a are positioned opposite to each other via the center axis J radially.

The first through portions 51a overlap the respective second core through holes 34b when viewed along the axial direction. Due to this, the opening portion 34e on the lower side in the second core through hole 34b is exposed to the outside of the rotor 13 via the first through portion 51a. Therefore, the opening portion 34e of the second core through hole 34b can be exposed to the outside of the rotor 13 while the first core through hole 34a and the second core through hole 34b are positioned at the same radial position.

The plurality of second through portions 51b is arranged along the circumferential direction. In the present embodiment, the plurality of second through portions 51b is arranged at equal intervals over the circumference along the circumferential direction. The second through portion 51b is circular when viewed along the axial direction. The number of provided second through portions 51b is eight, for example. The two first through portions 51a are connected respectively to two of the second through portions 51b of the plurality of second through portions 51b. More specifically, the radially outer end portion of the first through portion 51a is connected to the second through portion 51b. The inner diameter of the second through portion 51b is the same as the circumferential dimension of the first through portion 51a.

As shown in FIG. 5, the plurality of second through portions 51b each overlap a part of the magnet 40 when viewed along the axial direction. In the present embodiment, the second through portions 51b each overlaps a part of the circumferential center portion of each magnet 40 closer to the radial inside. The second through portion 51b also overlaps a part of the rotor core 30 when viewed along the axial direction. More specifically, the second through portion 51b overlaps a part of the rotor core body 31 including the magnet support surface 32 when viewed along the axial direction.

As shown in FIG. 7, a part of the magnet 40 is exposed inside the second through portion 51b. Therefore, when the resin portion 50 is molded by insert molding, the magnet 40 can be supported from below by a part of the mold, and the magnet 40 can be positioned axially. The magnet 40 can be visually recognized from below the first lid portion 51. Therefore, it is possible to observe the state of the magnet 40 held by the resin portion 50.

In the present embodiment, a part of the rotor core 30 is also exposed inside the second through portion 51b. Therefore, when the resin portion 50 is molded by insert molding, the rotor core 30 can be supported from below by a part of the mold. Thus, a part of the mold is brought into contact with the lower surface of the magnet 40 and the lower surface of the rotor core 30, thereby allowing the axial position of the magnet 40 and the axial position of the rotor core 30 to be aligned together.

The first lid portion 51 has a recess portion 51c depressed upward from the lower surface of the first lid portion 51. In the present embodiment, for example, two recess portions 51c are provided. The two recess portions 51c are positioned opposite to each other via the center axis J radially. In the present embodiment, the recess portion 51c axially penetrates the first lid portion 51. The recess portion 51c extends radially outward from the radial inner edge of the first lid portion 51. The recess portion 51c has a substantially rectangular shape radially elongated when viewed along the axial direction. The circumferential dimension of the recess portion 51c is the same as the circumferential dimension of the first through portion 51a, for example.

As shown in FIG. 5, the recess portion 51c is positioned at a position overlapping between the magnets 40 circumferentially adjacent to each other when viewed along the axial direction. More specifically, the radially outer end of the recess portion 51c overlaps the protrusion portion 33 and the circumferential end portion of the magnet 40 arranged on both circumferential sides of the protrusion portion 33 when viewed along the axial direction. Due to this, as shown in FIG. 7, the protrusion portion 33 and the circumferential end portion of the magnet 40 arranged on both circumferential sides of the protrusion portion 33 are exposed inside the recess portion 51c.

As shown in FIG. 4, the second lid portion 52 is positioned above the rotor core 30 and the magnet 40. Thus, the rotor core 30 and the magnet 40 can be axially sandwiched by the first lid portion 51 and the second lid portion 52, and the magnet 40 can be inhibited from moving axially with respect to the rotor core 30. Therefore, the magnet 40 can be inhibited from axially coming off. The second lid portion 52 is arranged radially inside the upper end portion of the tubular portion 61. The second lid portion 52 come into contact with the upper surface of the magnet 40 and the upper surface of the rotor core 30. The radial inner edge of the second lid portion 52 is positioned radially outside relative to the fixing hole portion 31a and radially inside relative to the first core through hole 34a. The outer diameter of the second lid portion 52 is substantially the same as the inner diameter of the tubular portion 61. The radial outer edge of the second lid portion 52 comes into contact with the inner circumferential surface of the tubular portion 61. The second lid portion 52 closes the first core through hole 34a from above. The upper end portion of the radial outer edge portion of the second lid portion 52 is a rounded shoulder portion 52c. The outer diameter of the shoulder portion 52c becomes smaller toward the upper side.

As shown in FIG. 6, the second lid portion 52 has a third through portion 52a and a fourth through portion 52b. The third through portion 52a and the fourth through portion 52b axially penetrate the second lid portion 52. The third through portion 52a is depressed radially outward from the radial inner edge of the second lid portion 52. In the present embodiment, two third through portions 52a are provided. The two third through portions 52a are positioned opposite to each other via the center axis J radially. The circumferential positions of the two third through portions 52a are the same as the circumferential positions of the two first through portions 51a, respectively. The third through portions 52a overlap the respective second core through holes 34b when viewed along the axial direction. Due to this, the opening portion 34f on the upper side in the second core through hole 34b is exposed to the outside of the rotor 13 via the third through portion 52a.

The plurality of fourth through portions 52b is arranged along the circumferential direction. In the present embodiment, the plurality of fourth through portions 52b is arranged at equal intervals over the circumference along the circumferential direction. The fourth through portion 52b is circular when viewed along the axial direction. The number of provided fourth through portions 52b is eight, for example. The inner diameter of the fourth through portion 52b is smaller than the circumferential dimension of the third through portion 52a. The inner diameter of the fourth through portion 52b is smaller than the inner diameter of the second through portion 51b. A part of the fourth through portion 52b is provided on the shoulder portion 52c.

The circumferential positions of the plurality of fourth through portions 52b are the same as the circumferential positions of the plurality of second through portions 51b, respectively. As shown in FIG. 4, the plurality of fourth through portions 52b each overlap a part of the magnet 40 when viewed along the axial direction. Therefore, when the resin portion 50 is molded by insert molding, a part of the mold can be arranged on the upper side of the magnet 40 to inhibit the axial position of the magnet 40 from being displaced upward. In the present embodiment, the fourth through portions 52b each overlaps a part of the circumferential center portion of each magnet 40. Unlike the second through portion 51b, the fourth through portion 52b does not overlap a part of the rotor core 30 when viewed along the axial direction.

It is to be noted that in place of the fourth through portion 52b, the second lid portion 52 may be provided with a bottomed hole portion depressed downward from the upper surface of the second lid portion 52. In this case, when the resin portion 50 is molded by insert molding, the resin enters axially between a part of the mold and the upper surface of the magnet 40.

The first coupling portion 53 axially extends through the core through hole 34 and connects the first lid portion 51 and the second lid portion 52. Thus, the resin portion 50 can be inhibited from coming off from the rotor core 30, and the resin portion 50 and the rotor core 30 can be coupled together. The first coupling portion 53 passes through the first core through hole 34a of the core through hole 34. The first coupling portion 53 has an axially extending columnar shape. The outer circumferential surface of the first coupling portion 53 comes into contact with the inner circumferential surface of the first core through hole 34a. The first coupling portion 53 is filled in the first core through hole 34a.

In the present embodiment, the resin portion 50 has a plurality of first coupling portions 53. The plurality of first coupling portions 53 passes through the plurality of first core through holes 34a, respectively. This allows the resin portion 50 and the rotor core 30 to be coupled more firmly.

As shown in FIGS. 5 to 7, the second coupling portion 54 is a portion in contact with the magnets 40 circumferentially adjacent to each other between the magnets 40 circumferentially adjacent to each other. Therefore, the second coupling portion 54 can inhibit the magnets 40 circumferentially adjacent to each other from moving circumferentially. The second coupling portion 54 extends axially and connects the first lid portion 51 and the second lid portion 52. This allows the resin portion 50 and the rotor core 30 to be coupled more firmly. As shown in FIG. 5, the second coupling portion 54 is positioned radially outside the protrusion portion 33. The radial inner surface of the second coupling portion 54 comes into contact with the radial outer surface of the protrusion portion 33. In the present embodiment, the resin portion 50 has a plurality of second coupling portions 54. The plurality of second coupling portions 54 is positioned between the magnets 40 circumferentially adjacent to each other, and connects the first lid portion 51 and the second lid portion 52.

As shown in FIGS. 2 and 3, the rotor cover 60 has the tubular portion 61 and a flange portion 62. The tubular portion 61 has an axially extending tubular shape. More specifically, the tubular portion 61 has a cylindrical shape about the center axis J. The tubular portion 61 opens on both axial sides. As shown in FIG. 4, the tubular portion 61 surrounds the rotor core 30 and the magnet 40 radially outside the magnet 40.

The upper end portion of the tubular portion 61 is a second swage portion 63 swaged radially inside. In the present embodiment, the second swage portion 63 has an annular shape about the center axis J. The second swage portion 63 comes into contact with the radial outer edge portion of the second lid portion 52 from above. Therefore, the second swage portion 63 can press the second lid portion 52 from above, and the resin portion 50 can be inhibited from coming off from the rotor cover 60 upward. In the present embodiment, the second swage portion 63 is swaged radially inside along the roundness of the shoulder portion 52c.

The radial inner edge of the second swage portion 63 is positioned radially inside relative to the radially outer end portion of the fourth through portion 52b and is positioned radially outside relative to the radially inner end portion of the fourth through portion 52b. The second swage portion 63 covers the radially outer end portion of the fourth through portion 52b from above. On the other hand, the second swage portion 63 does not cover the part of the fourth through portion 52b except for the radially outer end portion. Therefore, a part of the fourth through portion 52b and a part of the magnet 40 exposed inside the fourth through portion 52b are exposed to the outside of the rotor 13.

The flange portion 62 projects radially inward from the tubular portion 61 below the first lid portion 51. More specifically, the flange portion 62 projects radially inward from the lower end portion of the tubular portion 61. As shown in FIG. 3, in the present embodiment, the flange portion 62 has an annular plate shape about the center axis J. As shown in FIG. 4, the flange portion 62 is positioned below the rotor core 30 and the plurality of magnets 40. The lower surface of the first lid portion 51 is brought into contact with the upper surface of the flange portion 62.

The radial inner edge of the flange portion 62 is positioned radially outside relative to the core through hole 34. The radial inner edge of the flange portion 62 is positioned radially outward relative to the radially inner end portion of the second through portion 51b and is positioned radially inward relative to the radially outer end portion of the second through portion 51b. The flange portion 62 covers, from below, a part of the second through portion 51b except for the radially inner end portion. The radially outer edge portion of the flange portion 62 is a projection portion 62a projecting downward. The sectional shape orthogonal to the circumferential direction of the projection portion 62a is a downward protruding arc shape.

Figure 8:
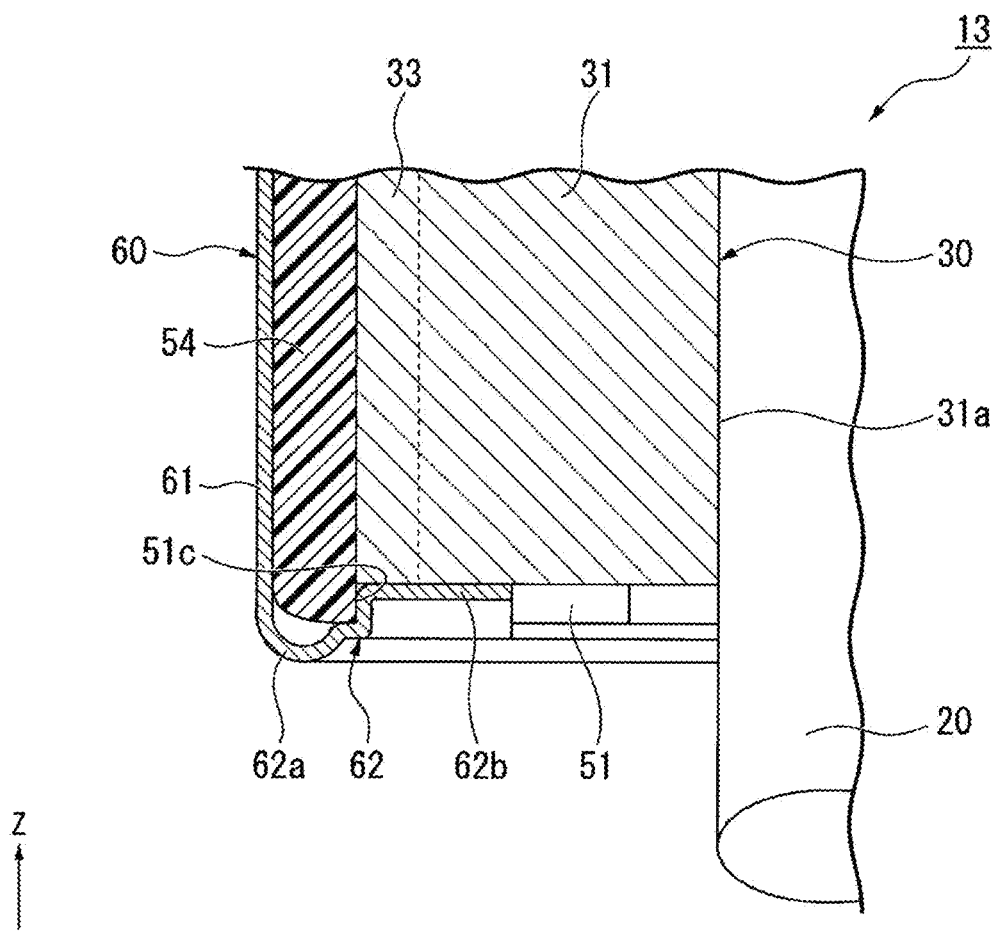
FIG. 8 is a sectional view showing a part of the rotor of the present embodiment, and is a sectional view of VIII-VIII in FIG. 3.

As shown in FIGS. 3 and 8, the flange portion 62 has a first swage portion 62b swaged upward. The first swage portion 62b is positioned inside the recess portion 51c. Therefore, the first swage portion 62b is hooked on the inner surface of the recess portion 51c, and the rotor cover 60 can be inhibited from rotating relative to the first lid portion 51. Thus, the rotor cover 60 can be inhibited from rotating relative to the resin portion 50. Therefore, without using an adhesive, the rotor cover 60 can be inhibited from rotating relative to the rotor core 30 held by the resin portion 50. Therefore, unlike the case of using an adhesive, even when each portion is thermally expanded or the like, fixation of the rotor core 30 and the rotor cover 60 can be inhibited from being released, and the rotor cover 60 can be inhibited from rotating relative to the rotor core 30. Thus, according to the present embodiment, the rotor cover 60 can be preferably inhibited from rotating relative to the rotor core 30.

According to the present embodiment, the recess portion 51c is positioned at a position overlapping between the magnets 40 circumferentially adjacent to each other. Therefore, when the first swage portion 62b is made by swaging a part of the flange portion 62 toward the inside of the recess portion 51c, it is possible to inhibit stress from being applied from the first swage portion 62b to the magnet 40. This can inhibit the magnet 40 from being damaged when the first swage portion 62b is formed.

According to the present embodiment, the recess portion 51c extends radially outward from the radial inner edge of the first lid portion 51. Therefore, the recess portion 51c can be radially elongated, and can be opened radially inward the first lid portion 51. Thus, a space where a jig or the like are arranged can be preferably secured when the first swage portion 62b is swaged.

In the present embodiment, by axially sandwiching the resin portion 50 by the flange portion 62 and the second swage portion 63, the rotor cover 60 can be inhibited from axially moving with respect to the resin portion 50, and the rotor cover 60 can be inhibited from rotating relative to the resin portion 50 by the first swage portion 62b. Thus, the rotor cover 60 is fixed to the resin portion 50, and is fixed via the resin portion 50 to the rotor core 30 and the magnet 40.

In the present embodiment, the first swage portion 62b is positioned inside the recess portion 51c at the radially outer end portion. The first swage portion 62b has a substantially square shape when viewed along the axial direction. The first swage portion 62b comes into contact with the inner surface of the recess portion 51c on the side surfaces on both circumferential sides and the side surface on the radial outside. As shown in FIG. 8, in the present embodiment, the first swage portion 62b comes into contact with the rotor core 30. Therefore, the first swage portion 62b can be pressed against the rotor core 30, and the rotor cover 60 can be directly and more firmly fixed to the rotor core 30. Due to this, the rotor cover 60 can be more preferably inhibited from rotating relative to the rotor core 30.

In the present embodiment, the first swage portion 62b comes into contact with the lower surface of the protrusion portion 33 and the lower surface of the radial outer edge portion of the rotor core body 31. The first swage portion 62b is provided at a radially inner portion of the flange portion 62. The radial inner edge of the first swage portion 62b is a part of the radial inner edge of the flange portion 62. The radial outer edge of the first swage portion 62b is positioned radially inside relative to the projection portion 62a.

As shown in FIG. 3, in the present embodiment, two first swage portions 62b are provided. The two first swage portions 62b are positioned inside the two recess portions 51c, respectively. Therefore, the rotor cover 60 can be more firmly fixed to the resin portion 50, and relative rotation between the rotor cover 60 and the rotor core 30 can be more preferably inhibited.

An operator or the like who assembles the rotor 13 of the present embodiment makes the resin portion 50 by insert molding with the rotor core 30 and the plurality of magnets 40 as insert members. More specifically, the operator or the like pours the molten resin into a mold containing the rotor core 30 and the plurality of magnets 40 to make the resin portion 50. At this time, for example, the magnet 40 is not yet magnetized. This can inhibit the magnet 40 from sticking to the mold, and the resin portion 50 can be easily removed from the mold. When the magnet 40 is a neodymium magnet or the like, the magnet 40 can be prevented from being demagnetized by the heat of the molten resin. In the following description, a coupled body in which the rotor core 30 and the magnet 40 are coupled by the resin portion 50 is simply referred to as a "coupled body".

It is to be noted that in the present description, the term "operator or the like" includes an operator who assembles the rotor 13 and an assembly apparatus that assembles the rotor 13. The assembly of the rotor 13 may be carried out by the operator alone, may be carried out by the assembly apparatus alone, or may be carried out by the operator and the assembly apparatus.

Next, the operator or the like covers the coupled body with the rotor cover 60. At this time, the rotor cover 60 is in a state where the first swage portion 62b and the second swage portion 63 have not yet been made. The operator or the like inserts the coupled body into the rotor cover 60 from the opening on the upper side of the tubular portion 61, and brings the lower surface of the coupled body into contact with the upper surface of the flange portion 62. The operator or the like makes the second swage portion 63 by swaging the upper end portion of the tubular portion 61 radially inward. Thus, the coupled body can be axially sandwiched by the flange portion 62 and the second swage portion 63. The operator or the like makes the first swage portion 62b by swaging a part of the flange portion 62 upward. Thus, the rotor cover 60 can be inhibited from rotating relative to the coupled body, and the rotor cover 60 can be fixed to the coupled body.

Next, the operator or the like fixes the shaft 20 through the fixing hole portion 31a. Then, the operator or the like magnetizes the magnet 40. At this time, the operator or the like inserts a pin or the like of a jig into the second core through hole 34b exposed to the outside of the rotor 13, and circumferentially positions each magnet 40. Thus, the rotor 13 is assembled. It is to be noted that magnetization of the magnet 40 may be carried out before the coupled body is molded. As described above, the magnet 40 can be visually recognized from below the first lid portion 51. Therefore, the operator or the like can also observe the state of the magnet 40 held by the resin portion 50 in the assembly process described above.

The present invention is not limited to the embodiment described above, and another configuration can be adopted. The number of the recess portions and the number of the first swage portions are not particularly limited, and may be one or three or more. In addition, a plurality of first swage portions may be positioned inside one recess portion. If the first swage portion is positioned inside the recess portion, the first swage portion may not come into contact with the inner surface of the recess portion, or may not come into contact with the rotor core and the magnet. The recess portions may not axially penetrate the first lid portion. In this case, the bottom surface of the recess portion is a part of the first lid portion. In this case, for example, the first swage portion does not come into contact with the rotor core and the magnet. The recess portion may not extend radially outward from the radial inner edge of the first lid portion. The recess portion may be provided at a position separated radially outward from the radial inner edge of the first lid portion.

The second swage portion may not be provided. The plurality of core through holes may all be the first core through holes or may all be the second core through holes. The core through hole may not be provided. A part of the resin portion may be positioned outside the rotor cover. The first coupling portion may not be provided. The second coupling portion may not be provided. The second lid portion may not be provided. It is to be noted that the number of magnets is not limited to eight, and may be any other number. The shape of the rotor core, the number of core through holes, the number of through portions, the number of recess portions, and the like may be appropriately changed in accordance with the number of magnets.

The application of the motor of the embodiment described above is not particularly limited. In addition, each configuration described in the present description can be combined as appropriate within a range that is not inconsistent with each other.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A rotor, comprising:
a shaft arranged along a center axis extending in one direction;
a rotor core fixed to the shaft;
a plurality of magnets positioned radially outside the rotor core and arranged along a circumferential direction;
a rotor cover having a tubular portion surrounding the rotor core and the magnet radially outside the magnet; and
a resin portion at least partially positioned radially inside the rotor cover, and coupling the rotor core and the magnet with each other and holding the rotor core and the magnet, wherein
the resin portion has a first lid portion positioned on one axial side of the rotor core and the magnet,
the rotor cover has a flange portion projecting radially inward from the tubular portion on one axial side of the first lid portion,
the first lid portion has a recess portion depressed from a surface on one axial side of the first lid portion to another axial side,
the recess portion is positioned at a position overlapping between the magnets circumferentially adjacent to each other when viewed along an axial direction,
the flange portion has a first swage portion swaged to another axial side, and
the first swage portion is positioned inside the recess portion.

2. The rotor according to claim 1, wherein
the recess portion axially penetrates the first lid portion, and
the first swage portion comes into contact with the rotor core.

3. The rotor according to claim 1, wherein
the first lid portion is annular along a circumferential direction, and
the recess portion extends radially outward from a radial inner edge of the first lid portion.

4. The rotor according to claim 1, wherein the resin portion has a second lid portion positioned on another axial side of the rotor core and the magnet.

5. The rotor according to claim 4, wherein
an end portion on another axial side of the tubular portion is a second swage portion swaged radially inside, and
the second swage portion comes into contact with a radially outer edge portion of the second lid portion from another axial side.

6. The rotor according to claim 4, wherein
the rotor core has a core through hole axially penetrating the rotor core,
the resin portion has a first coupling portion axially extending through the core through hole, and
the first coupling portion connects the first lid portion and the second lid portion.

7. The rotor according to claim 6, wherein
the rotor core has a plurality of the core through holes arranged side by side over a circumference along a circumferential direction,
some of the core through holes of the plurality of core through holes are first core through holes through which the first coupling portion passes,
some of the other core through holes of the plurality of core through holes are second core through holes positioned at positions different from positions of the first coupling portions when viewed along an axial direction, and
at least one of opening portions on both axial sides of the second core through hole is exposed to an outside of the rotor.

8. The rotor according to claim 7, wherein
the first lid portion
is annular along a circumferential direction, and
has a first through portion axially penetrating the first lid portion,
the first through portion is depressed radially outward from a radial inner edge of the first lid portion, and an opening portion on one axial side of the second core through hole is exposed to an outside of the rotor via the first through portion.

9. The rotor according to claim 4, wherein the magnets circumferentially adjacent to each other are arranged circumferentially apart from each other, and the resin portion has a portion in contact with the magnets between the magnets circumferentially adjacent to each other.

10. The rotor according to claim 9, wherein a portion of the resin portion, the portion in contact with the magnets between the magnets circumferentially adjacent to each other is a second coupling portion axially extending and connecting the first lid portion and the second lid portion.

11. The rotor according to claim 1, wherein the first lid portion has a plurality of second through portions axially penetrating the first lid portion, the plurality of second through portions are arranged along a circumferential direction, and each overlap a part of the magnet when viewed along an axial direction, and a part of the magnet is exposed inside the second through portion.

12. The rotor according to claim 11, wherein a part of the rotor core is exposed inside the second through portion.

13. A motor, comprising:

the rotor according to claim 1; and a stator facing the rotor radially via a gap.

* * * * *